US009527382B2

(12) United States Patent
Smetana

(10) Patent No.: US 9,527,382 B2
(45) Date of Patent: Dec. 27, 2016

(54) ELECTRIC AXLE FOR A VEHICLE
(71) Applicant: Tomas Smetana, Herzogenaurach (DE)
(72) Inventor: Tomas Smetana, Herzogenaurach (DE)
(73) Assignee: Schaeffler Technologies GmbH & Co. KG, Herzogenauraurach (DE)
(*) Notice: Subject to any disclaimer, the term of this patent is extended or adjusted under 35 U.S.C. 154(b) by 102 days.
(21) Appl. No.: 14/404,289
(22) PCT Filed: May 13, 2013
(86) PCT No.: PCT/EP2013/059819
§ 371 (c)(1),
(2) Date: Nov. 26, 2014
(87) PCT Pub. No.: WO2013/178458
PCT Pub. Date: Dec. 5, 2013
(65) Prior Publication Data
US 2015/0151634 A1   Jun. 4, 2015

(30) Foreign Application Priority Data

May 29, 2012 (DE) .......................... 10 2012 208 926

(51) Int. Cl.
| F16H 48/36 | (2012.01) |
| B60K 17/16 | (2006.01) |
| B60K 1/02 | (2006.01) |
| B60K 17/08 | (2006.01) |
| F16H 48/08 | (2006.01) |
| F16H 48/11 | (2012.01) |
| H02K 7/116 | (2006.01) |
| B60K 1/00 | (2006.01) |

(52) U.S. Cl.
CPC .................. *B60K 17/16* (2013.01); *B60K 1/02* (2013.01); *B60K 17/08* (2013.01); *F16H 48/08* (2013.01); *F16H 48/11* (2013.01); *F16H 48/36* (2013.01); *H02K 7/116* (2013.01); *B60K 2001/001* (2013.01); *F16H 2048/364* (2013.01); *F16H 2200/0021* (2013.01); *F16H 2200/2035* (2013.01)

(58) Field of Classification Search
CPC .................. F16H 2048/364; F16H 2200/0021
(Continued)

(56) References Cited

U.S. PATENT DOCUMENTS 1,036,659 A * 8/1912 Lindsay ................. F16H 48/08
180/905
2,882,752 A * 4/1959 Russell Robert C ..... F16H 3/64
475/204
(Continued)

FOREIGN PATENT DOCUMENTS

DE   10 2005 007 650   8/2006
DE   10 2008 061946    6/2010
(Continued)

OTHER PUBLICATIONS

"Highly Integrative and Flexible—Electric Drive Unit for Electric Vehicles" by Erik Schneider, Frank Fickl, Bernd Cebulski and Jens Liebold, ATZ, vol. 113, May 2000, pp. 360-365, see English description in specification.

*Primary Examiner* — Sherry Estremsky
(74) *Attorney, Agent, or Firm* — Davidson, Davidson & Kappel, LLC

(57) ABSTRACT

An electric axle for a vehicle, including an electric motor, a reduction gear section, a torque-distributing differential and two output shafts, where the electric motor, the torque-distributing differential and the two output shafts are disposed coaxially with a main transmission axis, and where the electric motor generates a drive torque which is reduced by the reduction gear section and distributed to the two output shafts via the torque-distributing differential, and further including a differential mechanism. The torque-distributing differential is designed as a planetary differential, and the differential mechanism is operatively connected to the torque-distributing differential via a shaft means disposed coaxially with the main transmission axis. The differential mechanism makes it possible to vary a speed difference and/or torque difference between the output shafts.

9 Claims, 1 Drawing Sheet

(58) Field of Classification Search
USPC .......................................... 475/221, 320, 225
See application file for complete search history.

(56) References Cited

U.S. PATENT DOCUMENTS

| | | | |
|---|---|---|---|
| 7,056,252 B2 * | 6/2006 | Gumpoltsberger et al. ...................... | B60K 17/16 475/150 |
| 8,974,341 B2 * | 3/2015 | Smetana et al. ......... | B60K 1/00 475/151 |
| 9,302,580 B2 * | 4/2016 | Smetana .................. | F16H 48/36 |
| 2004/0220011 A1 | 11/2004 | Gumpoltsberger et al. | |
| 2012/0149520 A1 * | 6/2012 | Schneidewind et al. ....................... | B60L 15/20 475/149 |

FOREIGN PATENT DOCUMENTS

| | | | |
|---|---|---|---|
| DE | 10 2011 101 151 | * | 12/2011 |
| DE | 10 2011 088 892 | * | 6/2013 |
| DE | 10 2012 206 434 | * | 10/2013 |

* cited by examiner

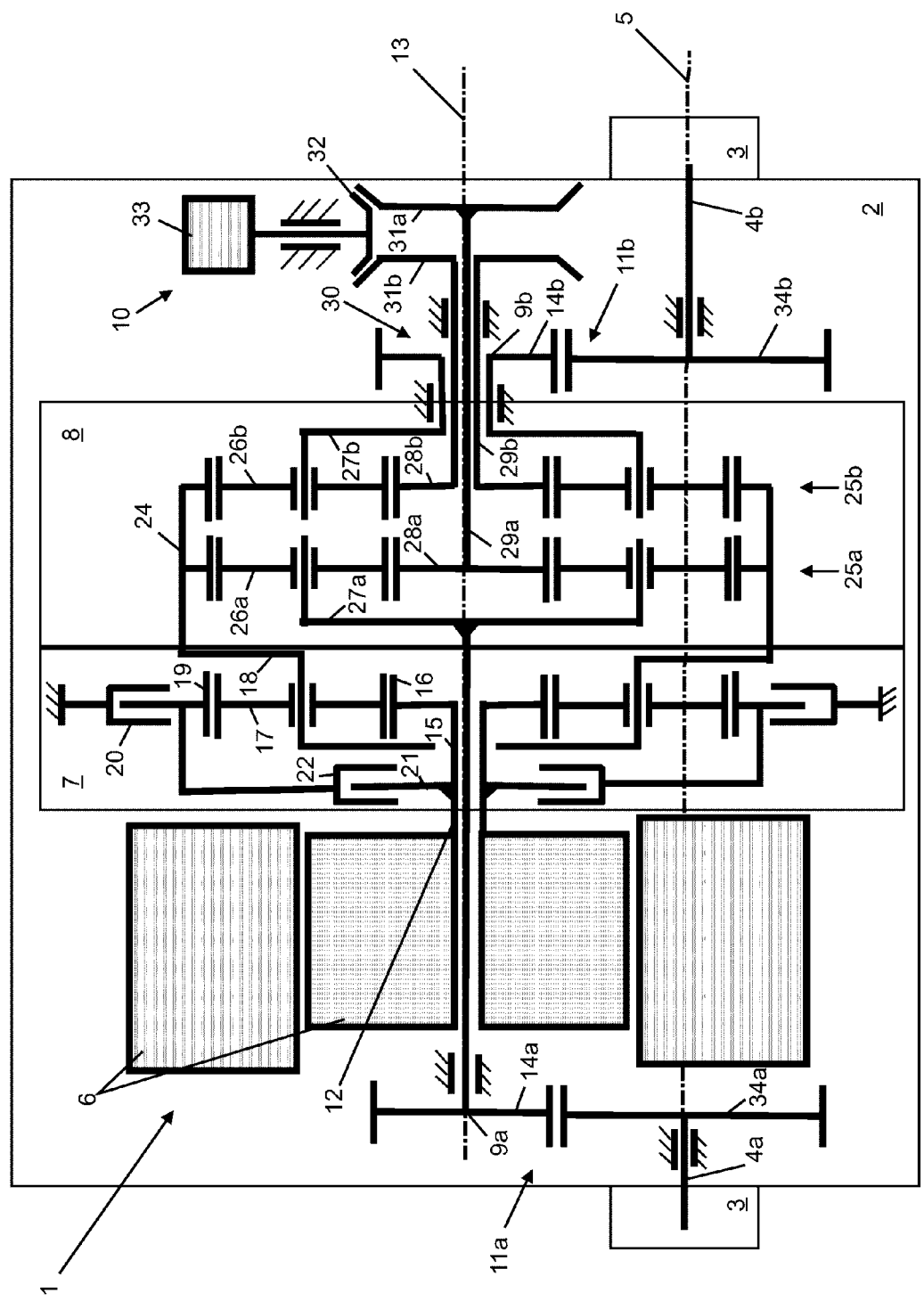

ELECTRIC AXLE FOR A VEHICLE

The present invention relates to an electric axle for a vehicle, including an electric motor, a torque-distributing differential, a reduction gear section, and two output shafts, where the electric motor, the torque-distributing differential and the two output shafts are disposed coaxially with a main transmission axis, and where the electric motor generates a drive torque which is reduced by the reduction gear section and distributed to the two output shafts via the torque-distributing differential.

BACKGROUND

Electric motors are increasingly used as drives in vehicles to provide alternatives to conventional internal combustion engines that require fossil fuels. Considerable efforts have already been made to improve the suitability of electric drives for everyday use, while also offering users the driving comfort they are used to.

A detailed description of an electric drive is provided in an article entitled "Highly Integrative and Flexible—Electric Drive Unit for Electric Vehicles" by Erik Schneider, Frank Fickl, Bernd Cebulski and Jens Liebold, which was published in the journal ATZ, Volume 113, 05/2011, pp. 360-365, and which is probably the closest prior art. This article describes a drive unit for an axle of a vehicle that includes an electric motor disposed concentrically and coaxially with a bevel-gear differential, and in which a two-speed shiftable planetary gear set which is also coaxial with the electric motor and the bevel-gear differential is disposed in the powertrain between the electric motor and the bevel-gear differential. The drive unit is very compact in design and, due to the two-speed shiftable planetary gear set, provides a good compromise between hill-climbing performance, acceleration and power consumption.

SUMMARY OF THE INVENTION

It is an object of the present invention to provide an electric axle for a vehicle that exhibits improved operating characteristics.

The present invention provides an electric axle for a vehicle. The vehicle is in particular an automobile, but in modified embodiments, it may also be a trike, a truck, or any other vehicle having at least one driven axle. The electric axle is preferably designed as a ready-to-install module which fits compactly into the vehicle.

The electric axle includes an electric motor adapted to generate a drive torque for the vehicle. The drive torque is preferably a main drive torque, so that the vehicle is driven solely by the main drive torque. In particular, the electric motor is dimensioned such that vehicle speeds greater than 50 km/h, preferably greater than 80 km/h, and in particular greater than 100 km/h can be reached. Particularly preferably, the electric motor has an output power greater than 30 kW, preferably greater than 50 kW, and in particular greater than 70 kW.

The electric axle further includes a reduction gear section operatively connected to the electric motor, so that the drive torque can be converted to a reduced drive torque. In particular, in at least one shift or operating state of the reduction gear section, the angular velocity and/or the number of revolutions per minute (rpm) at the input of the reduction gear section is greater than at the output of the reduction gear section. This upstream stage has the advantage that the rotational speed of the electric motor, which is typically rotating at high speed, is already reduced to be able to adapt the rotational speed to the desired speed of the driven wheels of the vehicle.

The electric axle includes a torque-distributing differential adapted to distribute the reduced drive torque to two output shafts. The output shafts are associated with the wheels on the axle of the vehicle.

It is particularly preferred that the output or rotor shaft of the electric motor be non-rotatably connected to an input of the reduction gear section and/or that an output of the reduction gear section be non-rotatably connected to an input of the torque-distributing differential and/or that the outputs of the torque-distributing differential be non-rotatably connected to two output shafts. The direct operative connection between the functional modules of the electric axle makes it possible to dispense with unnecessary intermediate components and to increase the compactness of the electric axle. Considering now the flow of torque through the electric axle, the drive torque is generated by the electric motor, reduced by the reduction gear section and distributed by the torque-distributing differential to the two output shafts.

The electric motor, in particular the rotor shaft of the electric motor, the torque-distributing differential and the two output shafts are disposed coaxially with each other and with a main transmission axis.

Within the scope of the present invention, it is proposed that the electric axle have a differential mechanism permitting variation of a speed difference and/or torque difference between the output shafts. In order to implement the present invention, the torque-distributing differential is designed as a planetary differential, and the differential mechanism is operatively connected to the torque-distributing differential via a shaft assembly disposed coaxially with the main transmission axis. The combination of a torque-distributing differential in the form of a planetary gear system and a shaft assembly arranged coaxially with the main transmission axis makes it possible to couple the differential mechanism to the torque-distributing differential without having to sacrifice the compactness of the electric axle.

The present invention provides an advantage over the prior art in that the electric axle has enhanced features, namely the ability to vary the speed difference and/or torque difference between the output shafts without having to sacrifice the compactness of the assembly. This makes it possible to provide the electric axle with features that are otherwise known mainly from drive trains having an internal combustion engine.

The differential mechanism may be a passive differential mechanism which compensates for a difference in rotational speed between the output shafts during cornering. Preferably, the differential mechanism is designed as an active differential mechanism capable of variably adjusting the torques between the output shafts. In particular, the active differential mechanism is designed as a torque-vectoring device. The active differential mechanism is, in particular, adapted to vary the torque distribution at the two output shafts in such a way as to allow the handling performance of the vehicle to be selectively controlled. During cornering, for example, the torque should be distributed such that the axle steers as well. To this end, for example in a bend, a higher torque is supplied to the curve-inner wheel having the slower angular velocity, so that cornering can be assisted selectively.

In a preferred structural embodiment of the present invention, the planetary differential includes two planetary drives, each including a sun gear, a planet carrier, and a set of planets. The two planetary drives are interconnected or coupled via a common ring gear. The reduced drive torque is introduced into the planetary differential via the common ring gear and distributed via the planets of the two planetary drives. The planet carriers are non-rotatably connected to the output shafts, so that the reduced drive torque is distributed to the output shafts by rotation of the planet carrier.

The sun gears are operatively connected to the differential mechanism via the shaft assembly. In the case of the passive differential mechanism, the sun gears can be coupled via the differential mechanism in such a way that rotation of one of the sun gears causes the other sun gear to rotate in the opposite direction. Optionally, the differential mechanism may additionally implement a locking effect, so that the forced counter-rotation of the sun gears is braked. In the case of the active differential mechanism, the sun gears can be rotated by the active differential mechanism in opposite directions relative to each other via the shaft assembly, and specifically in such a way that the reduced drive torque is distributed to the two output shafts as needed, optionally also non-uniformly or variably.

This preferred structural embodiment provides the advantage that the shaft assembly arranged coaxially with the main transmission axis is operatively connected to the sun gears, the sun gears being the components of the planetary differential that are the nearest components of the planetary differential as viewed radially from the main transmission axis. The small radial clearance between the shaft assembly and the sun gears facilitates the compact design of the electric axle.

In a preferred embodiment of the present invention, the shaft assembly includes two differential shaft sections disposed coaxially and concentrically with each other, and the differential mechanism is adapted to rotate the two differential shaft sections relative to each other in order to apply the auxiliary torque. In the aforedescribed preferred embodiment of the present invention, the differential shaft sections are each associated with a respective one of sun gears, so that rotation of the differential shaft sections relative to each other causes the sun gears to rotate relative to each other in the same fashion in order to achieve the variation in the speed difference and/or torque difference between the output shafts.

In a preferred refinement of the present invention, the shaft assembly includes two bevel differential gears disposed coaxially with the main transmission axis, each of the sun gears having one of the bevel differential gears associated therewith and non-rotatably coupled thereto, in particular via the differential shaft section. The active differential mechanism has a bevel drive gear and an auxiliary electric motor for driving the bevel drive gear, the bevel drive gear meshing with the bevel differential gear. In this particular embodiment, the axis of rotation of the bevel drive gear is perpendicular to the main transmission axis, so that rotation of the bevel drive gear causes the bevel differential gears, and thus the sun gears, to be rotated relative to each other so as to apply the auxiliary torque. This specific design has the advantage that the active differential mechanism may be disposed at any angular position about the main transmission axis, making it possible to flexibly respond with the electric axle to constraints imposed by the construction space available in the vehicle. The same configuration, but without the auxiliary electric motor and with a freewheeling bevel gear instead of the bevel drive gear, constitutes a possible embodiment of a passive differential mechanism.

In a particularly preferred embodiment of the present invention, the reduction gear section is designed as a shiftable planetary reduction gear mechanism which can be shifted between at least two different gear ratios. For example, a first gear ratio may be a step-down ratio to facilitate hill-starting of the vehicle. The second gear ratio may also be a step-down ratio, a 1:1 gear ratio, or even a step-up ratio to enable high angular velocities or rotational speeds of the output shafts, for example, when driving the vehicle on an expressway.

In a possible specific embodiment of the present invention, the planetary reduction gear mechanism has a double sun gear as an input and a planet carrier as an output. In addition, the planetary reduction gear mechanism further includes a ring gear, a set of planets, a clutch, and a brake. The clutch is adapted to make and break a non-rotatable connection between the double sun gear and the ring gear. In a first clutch position, these two components are non-rotatably connected to each other, while in a second clutch position, these components can be rotated independently of each other. The brake is adapted to act on the ring gear. When the brake is activated, the ring gear is held stationary within the electric axle, and when the brake is deactivated, the ring gear is able to rotate within the electric axle. The planetary reduction gear mechanism allows three different operating states to be obtained. In a first operating state, the brake is actuated and the clutch is open, so that the double sun gear drives the planets and thus the planet carrier. In a second operating state, the clutch is activated and the brake is released, so that the ring gear is non-rotatably connected to the double sun gear and the planets are locked against rotation about their axes. In a third operating state, the brake and the clutch are released simultaneously, so that the output and the input can be rotated independently of each other and the torque-distributing differential is decoupled from the electric motor.

In a possible refinement of the present invention, the electric axle has two drive shafts which are non-rotatably connectable to the wheels of the vehicle and which are coupled to the output shafts via reducing stages. This downstream reducing stage makes it possible, firstly, to space the drive axle of the electric axle parallelly from the main transmission axis so as, for example, to thereby increase the ground clearance of the vehicle. Secondly, the speed reduction is at least partially accomplished by the reducing stage, so that the reduction gear section or the torque-distributing differential do not have to perform this function and can therefore be made more compact. In a preferred embodiment, the reducing stage includes two meshing gears, one of the gears being non-rotatably connected to one of the output shafts, and another of the gears being non-rotatably connected to another of the output shafts.

In a preferred embodiment of the present invention, the electric motor is axially spaced from the torque-distributing differential with respect to the main transmission axis, and the reduction gear is positioned between the electric motor and the torque-distributing differential. Thus, these three assemblies (electric motor, reduction gear section and torque-distributing differential) are arranged linearly in series along the main transmission axis. In this embodiment, in particular, the rotor shaft is configured as a hollow shaft, so that one of the output shafts can extend through the electric motor.

This is because it is particular preferred to position the electric motor in a space between the driving elements of the output shafts in the axial direction with respect to the main transmission axis. In particular, the electric motor is positioned between the reducing stages. This design enables the electric axle to be made particularly compact.

However, it is also preferred that the differential mechanism, in particular the active differential mechanism, be positioned outside the above-defined space in the axial direction with respect to the main transmission axis. In this embodiment, it is particularly preferred that the output shaft be configured as a hollow shaft surrounding the shaft assembly, with a first shaft section being configured as a hollow shaft section and the second shaft section being configured as a through-shaft.

BRIEF DESCRIPTION OF THE DRAWINGS

Further advantages, features and effects of the present invention will become apparent from the following description of an exemplary embodiment thereof.

In the drawing, FIG. 1 is a schematic block diagram of an electric axle for a vehicle as an exemplary embodiment of the present invention.

DETAILED DESCRIPTION

FIG. 1 shows, in a schematic block diagram, an electric axle 1 for vehicle 2 as an exemplary embodiment of the present invention. The vehicle may, for example, be an automobile having wheels 3.

Electric axle 1 has two drive shafts 4a, b which are non-rotatably connected to the wheels 3 on a common axle; i.e., drive axle 5. Drive axle 5 may optionally be the front axle or the rear axle of vehicle 2. Electric axle 1 includes an electric motor 6 adapted to generate a drive torque for vehicle 2. Electric motor 6 may, for example, have an output power greater than 30 kW. In this example, electric motor 6 is the only prime mover for vehicle 2. In particular, no internal combustion engine was incorporated.

Electric axle 1 further includes a shiftable reduction gear section 7 capable of shifting the drive torque of electric motor 6 to different gear ratios. A torque-distributing differential 8 is adapted to distribute the converted torque to two output shafts 9a, b. In order to implement torque vectoring, electric axle 1 has an active differential mechanism 10 adapted to introduce an auxiliary torque into torque-distributing differential 8 so as to vary the torque distribution between the two output shafts 9a, b. Output shafts 9a, b are operatively connected to drive shafts 4a, b via a respective spur gear stage 11a, b.

Electric axle 1 is configured such that electric motor 6 and its rotor shaft 12, reduction gear section 7, and torque-distributing differential 8 including the two output shafts 9a, b, are arranged coaxially with a main transmission axis 13. Moreover, electric motor 6, reduction gear section 7 and torque-distributing differential 8 are arranged axially offset from each other between the spur-gear-type output elements 14a, b of output shafts 9a, b. Specifically, reduction gear section 7 is disposed between electric motor 6 and torque-distributing differential 8, so that electric motor 6 and torque-distributing differential 8 are arranged without overlapping in the radial direction relative to main transmission axis 13. Main transmission axis 13 and drive axle 5 are spaced apart parallelly from each other. This axially spaced arrangement makes it possible to increase the ground clearance of vehicle 2.

Hollow rotor shaft 12 is non-rotatably connected to an input of reduction gear section 7, the reduction gear section being designed as a planetary reduction gear mechanism, and the input being in the form of a double sun gear 15. First sun gear 16 of double sun gear 15 takes the form of a toothed spur gear and meshes with a set of planets 17 rotatably mounted on a planet carrier 18. The set of planets 17 in turn meshes with a ring gear 19. First sun gear 16, the set of planets 17, planet carrier 18, and ring gear 19 form a planetary drive in which the axes of rotation of planets 17 are arranged on planet carrier 18 on a circle spaced from main transmission axis 13, and in which the set of planets 17 meshes with both the first sun gear and ring gear 19.

A brake 20 stationarily disposed within electric axle 1 is adapted to hold ring gear 19 stationary. Second sun gear 21 of double sun gear 15 is designed as a clutch disk which may be alternatively non-rotatably coupled to ring gear 19 or released by a clutch 22. In the disengaged state, second sun gear 21 and ring gear 19 can move about main transmission axis 13 independently from each other and without being directly coupled to each other. Planet carrier 18 forms the output of reduction gear section 7.

In a first operating state, brake 20 is actuated, so that ring gear 19 is held stationary within electric axle 1. In contrast, clutch 23 is deactivated, so that second sun gear 21 runs free in clutch 22. In this operating state, the torque is transmitted via first sun gear 16 to the set of planets 17, and thus to planet carrier 18, which forms the output.

In a second operating condition, brake 20 is open and clutch 22 is closed, so that second sun gear 21 and ring gear 19 are non-rotatably connected to each other. In this second operating state, ring gear 19, the set of planets 17, and double sun gear 15 travel as a single block about main transmission axis 13.

In a third operating state, both brake 20 and clutch 22 are open, so that the flow of torque between the input and the output of reduction gear section 7 is interrupted.

Planet carrier 18 is non-rotatably connected to a ring gear 24 which constitutes the input of torque-distributing differential 8. Torque-distributing differential 8 has a planetary differential formed by two planetary drives 25a, b, which both use the common ring gear 24, so that the two planetary drives 25a, b are coupled via the common ring gear 24. Each planetary drive 25a, b includes a sun gear 28a, b and a set of planets 26a, b which are rotatably mounted on a respectively associated planet carrier 27a, b along a circle about main transmission axis 13. In each planetary drive 25a, b, the set of planets 26, b meshes with the associated sun gear 28a, b and the common ring gear 24. Planet carriers 27a, b constitute the outputs of torque-distributing differential 8 and are each non-rotatably connected to the respective output shaft 9a, b.

When sun gears 28a, b are held stationary, the reduced drive torque is introduced into torque-distributing differential 8 via the common ring gear 24 which rotates about main transmission axis 13. Due to the meshing engagement of ring gear 24 with the set of planets 26a, b, these sets of planets are carried along in the orbital direction and roll on sun gears 28a, b, so that planet carriers 27a, b are also moved in the orbital direction and uniformly distribute the reduced drive torque to output shafts 9a, b.

However, sun gears 28a, b are not mounted stationary within electric axle 1, but are each disposed on respective differential shaft sections 29a, b which are disposed coaxially with each other and with main transmission axis 13. Differential shaft sections 29a, b form part of a shaft assembly 30 extending through output element 14b and having bevel gears 31a, b which are non-rotatably mounted on the free ends of differential shaft sections 29. Thus, bevel gears 31a, b are non-rotatably coupled to the associated sun gears 28a, b. Active differential mechanism 10 includes a bevel differential gear 32 drivable by an auxiliary electric motor 33. Bevel differential gear 32 meshes simultaneously with both bevel differential gears 31 a, b, so that bevel differential gears 31 a, b can be rotated relative to each other by energizing auxiliary electric motor 33 and the resulting rotation of bevel drive gear 32. As a result, sun gears 28a, b are also rotated relative to each other, thereby varying the distribution of the reduced drive torque between output shafts 9a, b.

With regard to structural design features, it should be noted that rotor shaft 12 is configured as a hollow shaft through which output shaft 9a extends concentrically and coaxially. Output shaft 9b is also configured as a hollow shaft in which differential shaft section 29b is disposed concentrically and coaxially as a further hollow shaft in which differential shaft 29a extends concentrically and coaxially.

Output elements 14a, b take the form of spur gears meshing with further spur gears 34a, b non-rotatably mounted on drive shafts 4a, b, thus forming the spur gear stages 11 a, b and, in particular, an additional reduction gear.

LIST OF REFERENCE NUMERALS 1 electric axle
2 vehicle
3 wheel
4 drive shaft
5 drive axle
6 electric motor
7 shiftable reduction gear section
8 torque-distributing differential
9 output shaft
10 active differential mechanism
11 spur gear stage
12 rotor shaft
13 main transmission axis
14 output element
15 double sun gear
16 first sun gear
17 set of planets
18 planet carrier
19 ring gear
20 brake
21 second sun gear
22 clutch
24 ring gear
25 planetary drive
26 set of planets
27 planet carrier
28 sun gear
29 differential shaft section
30 shaft assembly
31 bevel gear
32 bevel differential gear
33 auxiliary electric motor
34 spur gear

The invention claimed is:

1. An electric axle for a vehicle comprising:
an electric motor;
a reduction gear section;
a torque-distributing differential; and
two output shafts, the electric motor, the torque-distributing differential and the two output shafts being disposed coaxially with a main transmission axis,
the electric motor generating a drive torque which is reduced by the reduction gear section and distributed to the two output shafts via the torque-distributing differential,
a differential mechanism, and wherein the torque-distributing differential is designed as a planetary differential, and the differential mechanism is operatively connected to the torque-distributing differential via a shaft assembly disposed coaxially with the main transmission axis, and wherein the differential mechanism can vary a speed difference or torque difference between the output shafts;
wherein the differential mechanism is positioned outside the space between free ends of the output shafts in the axial direction with respect to the main transmission axis.

2. The electric axle as recited in claim 1 wherein the planetary differential includes two sun gears, two planet carriers, two sets of planets and a common ring gear, the reduced drive torque being introduced via the common ring gear, the planet carriers being non-rotatably connected as outputs to output shafts, and the sun gears being operatively connected to the differential mechanism via the shaft assembly.

3. The electric axle as recited in claim 1 wherein the shaft assembly includes two differential shaft sections disposed coaxially and concentrically with each other, and the differential mechanism is adapted to rotate the two differential shaft sections relative to each other in order to achieve the variation in the speed difference or torque difference between the output shafts.

4. The electric axle as recited in claim 1 wherein the reduction gear section is designed as a shiftable planetary reduction gear mechanism and can be shifted between two different gear ratios.

5. The electric axle as recited in claim 4 wherein the planetary reduction gear mechanism includes:
as an input, a sun gear and a clutch disk; and a planet carrier as an output, as well as a ring gear, a set of planets, a clutch, and a brake, the clutch activating and releasing a non-rotatable connection between the clutch disk and the ring gear, and the brake acting on the ring gear, and wherein in a first operating state, the brake is actuated and the clutch is released, and in a second operating state, the brake is released and the clutch is activated.

6. The electric axle as recited in claim 1 further comprising two drive shafts non-rotatably connectable to wheels of the vehicle, the drive shafts being coupled to the output shafts via reducing stages.

7. The electric axle as recited in claim 1 wherein the electric motor is spaced from the torque-distributing differential in the axial direction with respect to the main transmission axis, and the reduction gear is positioned between the electric motor and the torque-distributing differential.

8. The electric axle as recited in claim 1 wherein the electric motor is positioned in a space between free ends of the output shafts in the axial direction with respect to the main transmission axis.

9. An electric axle for a vehicle comprising:
an electric motor;
a reduction gear section;
a torque-distributing differential; and
two output shafts, the electric motor, the torque-distributing differential and the two output shafts being disposed coaxially with a main transmission axis, the electric motor generating a drive torque which is reduced by the reduction gear section and distributed to the two output shafts via the torque-distributing differential, a differential mechanism, and wherein the torque-distributing differential is designed as a planetary differential, and the differential mechanism is operatively connected to the torque-distributing differential via a shaft assembly disposed coaxially with the main transmission axis, and wherein the differential mechanism can vary a speed difference or torque difference between the output shafts;

wherein the planetary differential includes two sun gears, wherein the shaft assembly includes two bevel differential gears disposed coaxially with the main transmission axis, each of the two sun gears having one of the bevel differential gears associated therewith and non-rotatably coupled thereto, and wherein the differential mechanism is designed as an active differential mechanism having a bevel drive gear and an auxiliary motor for driving the bevel drive gear, the axis of rotation of the bevel drive gear being perpendicular to the main transmission axis, so that rotation of the bevel drive gear causes the bevel differential gears, and thus the sun gears, to be rotated relative to each other.

* * * * *